United States Patent Office 2,987,556
Patented June 6, 1961

2,987,556
1-VINYL-3-CYCLOHEXENOL
William F. Brill, Skillman, N.J., assignor to Petro-Tex Chemical Corporation, Houston, Tex., a corporation of Delaware
No Drawing. Filed Feb. 20, 1959, Ser. No. 794,514
1 Claim. (Cl. 260—617)

This invention relates to a stable tertiary allylic alcohol and relates more particularly to 1-vinyl-3-cyclohexenol and to processes for making the same.

1-vinyl-3-cyclohexenol, which has the formula

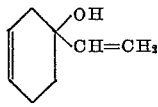

is readily prepared from 4-vinylcyclohexene hydroperoxide, either by decomposing the 4-vinylcyclohexene hydroperoxide by heating or by catalytic or sulfite reduction.

1-vinyl-3-cyclohexenol is a new and valuable alicyclic alcohol. The novel compound is a stable tertiary allylic alcohol having both hydroxyl and vinyl functions and it finds use both as a monomer and as a chemical intermediate. The 1-vinyl-3-cyclohexenol may be polymerized with other vinyl or vinylidene type monomers to provide polymers containing a hydroxyl group which is useful in enhancing the strength of vinyl polymers through hydrogen bonding. The hydroxyl group is also readily available for reactions of the hydroxyl group for polymeric cross linking purposes, or for introduction of other desirable functional groups into the polymer. Further, this novel compound, possessing both a vinyl and hydroxyl grouping, offers many possibilities in providing additional useful chemical compounds which are not readily obtained by any other route, such as 3,4-dichloro-1 (1,2-dichloroethyl) cyclohexanol. This excellent solvent is prepared by addition of chlorine to 1-vinyl-3-cyclohexenol.

4-vinylcyclohexene hydroperoxide of the formula

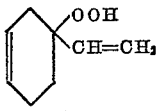

is obtained in good yield by reacting molecular oxygen with 4-vinylcyclohexene at moderate temperatures as is described in my copending application, Serial Number 794,515, filed February 20, 1959, now U.S. Patent 2,954,406. Passing oxygen through 4-vinylcyclohexene at 50–90° C. for several hours provides 4-vinylcyclohexene hydroperoxide in good yield which is readily isolated as by fractionation. 4-vinylcyclohexene itself is obtained as a by-product of butadiene production or is prepared by dimerizing butadiene-1,3 in the presence of a polymerization inhibitor such as hydroquinone.

The following embodiments of the invention are representative in disclosing methods for preparing 1-vinyl-3-cyclohexenol.

One mole of 4-vinylcyclohexene was placed in a reactor equipped with a gas inlet, a condenser, and heating and cooling means. The 4-vinylcyclohexene was heated to 90° C. and stirred with a paddle stirrer at 250 r.p.m. Oxygen gas was passed through the 4-vinylcyclohexene at this temperature for several hours until a hydroperoxide concentration of 15 percent was reached. The reaction mixture was then cooled and after separation of the vinylcyclohexene from the small amount of oil formed, it was distilled at reduced pressure to remove the vinylcyclohexene. The distilled product was then vacuum distilled to obtain 1-vinyl-3-cyclohexenol at 46° C. at one mm. The 1-vinyl-3-cyclohexenol had a refractive index $n_D^{20}$ 1.4926. Some 4-vinylcyclohexene hydroperoxide was also obtained. The alcohol had an infrared spectra similar to that of 4-vinylcyclohexene hydroperoxide except for the presence of a band at 10.87 mu. On hydrogenation of the alcohol, the total hydrogen consumed was that required by a compound of molecular weight 124 containing two double bonds. Hydrogen consumption of the 1-vinyl-3-cyclohexenol, in alcohol at 60 pounds pressure with platinum oxide as catalyst, stopped completely at 0.242 mole, calculated 0.24.

In another embodiment of this invention, two moles of 4-vinylcyclohexene were reacted with oxygen at 90° C. for 22 hours and on distillation gave 0.3 mole of 1-vinyl-3-cyclohexenol. Better yields of 1-vinyl-3-cyclohexenol are obtained by conducting the oxidation for lesser periods of time to lower concentrations of 4-vinylcyclohexene hydroperoxide and subjecting the oxidation mixture or isolated 4-vinylcyclohexene hydroperoxide to heat alone, or while dissolved in a solvent.

For another procedure to prepare 1-vinyl-3-cyclohexenol, 0.1 mole of 4-vinylcyclohexene hydroperoxide of 76.8 percent purity was added dropwise to 50 milliliters of a stirred 25 percent solution of sodium sulfite, cooled in an ice bath. After one hour the reaction was allowed to reach room temperature and was stirred for another one and one-half hours. The resulting product was extracted with ether and dried. After removal of ether, the product was distilled and the 1-vinyl-3-cyclohexenol was collected at 46 to 49° C. at 0.5 mm. The identity of the alcohol was confirmed by its infra-red spectra.

Purified 1-vinyl-3-cyclohexenol polymerizes readily with styrene in the presence of about one to two percent cumene hydroperoxide to form a polymer having improved softening point. The monomer mixture preferably contains more than 50 percent styrene.

Chlorine reacts with 1-vinyl-3-cyclohexenol by adding to the double bonds to form 3,4-dichloro-1(1,2-dichloroethyl)cyclohexanol. 1-vinyl-3-cyclohexenol is dissolved in cyclohexane and chlorine passed through the solution for a period of about one hour and the resulting 3,4-dichloro-1(1,2-dichloroethyl)cyclohexanol is separated by distillation. The bromine derivative is readily prepared by stirring bromine into a similar 1-vinyl-3-cyclohexenolcyclohexane solution.

I claim:
1-vinyl-3-cyclohexenol.

References Cited in the file of this patent

UNITED STATES PATENTS

| | | |
|---|---|---|
| 2,484,841 | Lorand | Oct. 18, 1949 |
| 2,513,179 | Johnson et al. | June 27, 1950 |

OTHER REFERENCES

Farmer et al.: J. Chem. Soc. (London), 1942, pp. 123 and 134.

Stork et al.: J. Am. Chem. Soc., vol. 75, pp. 3198, 3202 (1953).